United States Patent Office 3,094,543
Patented June 18, 1963

3,094,543
PREPARATION OF 9(11)-ANHYDRO STEROIDS FROM 11-HYDROXY STEROIDS
George G. Hazen, Northumberland, Pa., and Dale W. Rosenburg, Elkton, Va., assignors to Merck & Co., Inc., Rahway, N.J., a corporation of New Jersey
No Drawing. Filed July 3, 1961, Ser. No. 121,298
17 Claims. (Cl. 260—397.45)

This invention relates to the preparation of steroids, and particularly, to the preparation of $\Delta^{9(11)}$-anhydrosteroids from 11-hydroxy-steroids.

This application is a continuation-in-part of our co-pending application Serial No. 29,811, filed May 18, 1960 (now abandoned), which in turn is a continuation-in-part of Serial No. 849,430, filed October 29, 1959 (now abandoned).

The dehydration of an 11-hydroxy-steroid of the pregnane series to give the corresponding $\Delta^{9(11)}$-anhydrosteroid is a well-known reaction. Suggested methods, starting with the 11β-hydroxy-steroid, include treating with an organic acid halide reactant, especially methane sulfonyl chloride, in the presence of an organic base in a solvent for the steroid. This method has several disadvantages. It requires an extended period of time, and often gives low product yields. Moreover, it is often difficult to obtain consistent results. An improvement occasionally obtained often cannot be duplicated.

It has been suggested to subject 11α-hydroxy steroids, after first acylating any 21-hydroxy group, to tosylation to form the corresponding 11α-tosylate compound. The latter compound is then reacted with sodium acetate and boiling acetic acid to form the corresponding $\Delta^{9(11)}$-anhydro-steroid. This reaction differs from the reaction mentioned above, in that, it requires two distinct steps to remove the 11α-hydroxy group and form a double bond at position 9(11). This method has not been applied to 11β-hydroxy-steroids, because when the hydroxy group is in the β-configuration it is not subject to acylation, except under such severe conditions as to cause the destruction of the molecule. This is especially the case with a steroid having a 17-position side chain because of the recognized lability of such a side chain, and also with steroids having a double bond at the 4-position which would be expected to undergo reaction.

It is an object of this invention to provide a simplified procedure for converting 11-hydroxy-steroids to the corresponding $\Delta^{9(11)}$-anhydro-steroid. It is another object to provide such a process whereby the conversion is carried out directly in one step in high yield. It is a further object of the invention to provide such a process, which can be applied to a broad group of steroids, with uniformly good results. Other objects and the advantages of the invention will appear hereinafter.

In accordance with the invention 11-hydroxy-steroids are converted to the corresponding $\Delta^{9(11)}$-anhydro-steroid by the dehydrating action of an acid halide reactant, either with or followed by treatment with anhydrous sulfur dioxide, in the presence of an organic base. Instead of sulfur dioxide, other gaseous anhydrides of weak acids, as for example anhydrous nitrous oxide, anhydrous carbon dioxide and the like may be employed. Solid acid anhydrides such as phosphorous trioxide may likewise be employed in this reaction.

In a preferred embodiment of the invention the anhydrous sulfur dioxide gas is passed into the organic acid halide to form a mixture which is then reacted with the 11-hydroxy-steroid. Best results are usually obtained when the weight of sulfur dioxide absorbed by the organic acid halide is equivalent to 3 to 4 percent of the weight of the organic acid halide. The amount of the sulfur dioxide, however, is not critical. In an attempt to determine how much sulfur dioxide is required, the surprising effect of even a minute amount of sulfur dioxide was soon discovered. Quantities below 1 percent are generally not recommended, while quantities above 10 percent are unnecessary as they do not accelerate the reaction nor increase the yields further. The optimum amount of sulfur dioxide to be used may vary with the particular 11-hydroxy-steroid and organic acid halide employed as starting material, as well as with the operating conditions. With methane sulfonyl chloride quantities of 2–5 percent generally represent a practical limit.

Acid halides, such as organic sulfonyl halides having the formula $RSO_2X$, wherein R may be either an alkyl or aryl radical, and X represents chlorine, bromine or iodine, may be used. Typical examples of such compounds are the alkane sulfonyl chlorides such as methanesulfonyl chloride, ethanesulfonyl chloride, propanesulfonyl chloride and butanesulfonyl chloride, and the aryl sulfonyl chlorides, such as benzenesulfonyl chloride and p-toluenesulfonyl chloride. Acid chlorides such as benzoyl chloride and p-nitrobenzoyl chloride may also be employed. The lower alkane (from one to four carbon atom chain) sulfonyl chlorides are distinctly advantageous because the reaction may be carried out under more desirable conditions. Methanesulfonyl chloride is particularly preferred. The organic sulfonyl chloride is usually used in from one to ten moles per mole of the 11-hydroxy-steroid.

The dehydration reaction is carried out in the presence of an organic base. Typical examples of classes of such bases are pyridines; N-alkyl-morpholines; N-alkyl-piperidines; lutidines; collidines; and trialkylamines. Of particular mention are the more readily available members of these groups, such as pyridine; N-methylmorpholine; N-ethylmorpholine; α,γ-lutidine; collidine; nicotine; trimethylamine; triethylamine; tripropylamine; dimethylaniline; N-amylpiperidine; N-butylpiperidine; N-ethylpiperidine; N-methylpiperidine; N-heptylpiperidine; and N-propylpiperidine. The base is preferably present in from one to ten moles for each mole of steroid. The base selected is preferably one that is also a solvent for the 11-hydroxy-steroid, such as pyridine or lutidine. The ability of any of the bases to act as a solvent for the steroid under the conditions of the reaction may be readily determined by a simple solubility test.

The reaction is conveniently carried out in a solvent for the steroid. The solvent, as mentioned above, may also serve as the base. The solvent may also be a mixture of a hydrocarbon and a base, such as benzene-pyridine mixture or a mixture of a chlorinated hydrocarbon and a base, such as methylene chloride and pyridine. Other solvents which may be mentioned are dimethylformamide, diethylacetamide, chloroform, acetone, propylene glycol, methyl ethyl ketone and anhydrous mixtures of these solvents.

It is an advantage of this invention that the time required for the reaction is very greatly shortened over prior methods, using an organic acid chloride without the sulfur dioxide. For example, the reaction time for converting $\Delta^4$-pregnene-11β,17α,21-triol-3,20-dione 21-acetate by known processes, using methane-sulfonyl chloride at room temperature is about 16 hours. When a mixture of methanesulfonyl chloride with 3 percent by weight of sulfur dioxide is used according to our invention, a spontaneous reaction results and the reaction product can be isolated almost immediately. However, a longer reaction time has no adverse effect upon the yield. An even greater advantage of the invention is that good yields of the 9(11)-anhydro-steroid are obtained under operating conditions which give only a negligible yield when no sulfur dioxide is used. The reaction usually occurs spontaneously at moderate temperatures, even as low as 0° C. or less, reducing the likelihood of decomposition and other side reactions. The reaction time may depend in part upon the particular reactants, solvents and temperatures.

Any of the 11-hydroxy-steroids, and particularly, the pregnanes and pregnenes may be converted to the corresponding $\Delta^{9(11)}$-anhydro-steroid. Compounds particularly suitable as initial reactants in the process of this invention include the 11β-hydroxy-steroids, for example, the hydrocortisone, prednisolone and 16α-methyl-prednisolone 21-acetates. The presence of various substituents in the steroid molecule, such as keto groups in the 3 and/or 20 positions, hydroxy groups in the 3 and/or 17 positions, and ring double bonds, does not interfere with the reaction. Reactive hydroxyl groups other than the 11-hydroxyl, and in particular, the 21-hydroxyl group, may be protected prior to the dehydrating action by converting to the corresponding ester. Particular examples of 11β-hydroxy-steroids are the 21-esters of $\Delta^4$-pregnene-11β,-17α, 21-triol-3,20-dione, such as the acetate, propionate, formate, butyrate, benzoate, t-butylacetate, hemisuccinate and phenyl-acetate esters; $\Delta^4$-pregnene-11β,17α-diol-3,20-dione, $\Delta^4$-pregnene-11β-ol-3,20-dione; $\Delta^4$-pregnene-11β,21-diol-3,20-dione 21-acetate; acetate esters of $\Delta^4$-pregnene-11β,17α,21-triol-3,20-dione; $\Delta^4$ - androstene-11β-ol-3,17-dione; $\Delta^4$-pregnene-11β,17α,21-triol-3,20-dione; pregnane-11β-ol-3,20-dione; pregnane - 11β,21-diol-3,20-dione 21-acetate; pregnane-11β,17α,21-triol-3,20-dione; allo-pregnane-11β,17α,21-triol-3,20-dione; $\Delta^5$ - pregnene - 3β,-11β-diol-20-one, and $\Delta^5$-pregnene-11β,17α,21-triol-3,20-dione 21-acetate-3,20-bis-ethylene-ketal. Many of the $\Delta^{9(11)}$-steroids thus produced are known to possess marked physiological activity.

Various changes and modifications may be made in the present invention, certain preferred embodiments of which are herein disclosed, without departing from the scope thereof; to the extent that these changes and modifications are within the scope of the appended claims, they are to be considered a part of this invention.

*Example 1*

A scrupulously clean, dry container of non-corrodible material such as glass or polyethylene is equipped with a gas inlet tube, a dry-vent opening and a mechanical agitator. The container is charged with 100 ml. of reagent grade methane-sulfonyl chloride. Anhydrous sulfur dioxide gas is passed into the methanesulfonyl chloride, which is agitated with the mechanical agitator, until the weight of sulfur dioxide absorbed is equivalent to 3.5 to 5% of the weight of the methanesulfonyl chloride. (The rate of solution of sulfur dioxide in the methanesulfonyl chloride is high when good agitation is employed. A considerable vacuum is created as the sulfur dioxide above the surface of the liquid goes into solution, but no trap in the gas inlet tube is necessary unless the tube extends below the surface of the liquid.) After the addition of sulfur dioxide is completed, agitation is continued for 5 minutes longer and then the container is capped.

A mixture of 16.7 g. (0.04 mole) of 16α-methyl-prednisolone 21-acetate (16α-methyl-$\Delta^{1,4}$-pregnadiene-11β,17α,-21-triol-3,20-dione 21-acetate), 100 ml. of dimethylformamide and 33.4 ml. of "natural" collidine is cooled to 10° C. Ten ml. of the methanesulfonyl chloride-sulfur dioxide mixture, prepared as above, is added during 1 to 2 minutes while the resulting mixture is stirred efficiently. The temperature quickly rises and when it reaches 25° C. the time is noted for the beginning of a 5-minute reaction period. The temperature is maintained at 25–35° C. by applying cooling as necessary. A light colored precipitate separates during the reaction and the color of the solution darkens to a reddish hue. When 5 minutes has elapsed an ice bath is placed in position to cool the reaction flask. Then 16.7 ml. of water is added dropwise during 1 to 2 minutes. Sufficient water is then added to just dissolve the suspended precipitate without causing further precipitation of the product. The clear, orange to red solution is then added dropwise with good agitation to 1 liter of water during a period of 15–30 minutes. The reaction flask and funnel are rinsed successively with 10 ml. of methanol and 25–50 ml. of water. The rinses are added to the slurry. The resulting slurry is then aged for one hour at 25–30° C. and filtered. The cake is washed with water and dried to constant weight. The yield of product melting at 203–211° C. is essentially quantitative (greater than 96%). Recrystallization from ethanol raises the melting point to 216.5–218° C.

When the above procedure is followed using methanesulfonyl chloride containing only a trace of sulfur dioxide, only a negligible yield of the 16α-methyl-9(11)-anhydroprednisolone-21-acetate is obtained.

*Example 2*

Employing the procedure described in Example 1, and using 16.15 g. (0.04 mole) of prednisolone 21-acetate ($\Delta^{1,4}$-pregnadiene-11β,17α,21-triol-3,20-dione 21-acetate) the crude 9(11)-anhydroprednisolone 21-acetate, melting point 154–205° C., is isolated in a yield of 103%. Paper-strip chromatography shows that the dehydration has proceeded quantitatively. Refluxing the product with five parts of acetone permits a 46.8% recovery of a product which melts at 220–222° C.

When the same procedure is followed, using methanesulfonyl chloride containing only a trace of sulfur dioxide, only a negligible yield of the 9(11)-anhydroprednisolone 21-acetate is obtained.

*Example 3*

The procedure described in Example 1, using 16.2 g. (0.04 mole) of hydrocortisone 21-acetate ($\Delta^4$-pregnene-11β,17α,21-triol-3,20-dione 21-acetate), gives the $\Delta^{4,9(11)}$-pregnadiene-17α,21-diol-3,20-dione 21-acetate. Because of the insolubility of the dimethylformamide solvates of both of the starting material and the product, a clear solution is not obtained at any time. The crude solvated product, melting point 195–224° C., is isolated in 112% yield. A reflux-slurry treatment with ten parts of methanol gives a product melting at 234.5–237° C. in an overall yield of 87%.

When the same procedure is followed, using methanesulfonyl chloride containing only a trace of sulfur dioxide, only a negligible yield of the $\Delta^{4,9(11)}$-pregnadiene-17α,21-diol-3,20-dione 21-acetate is obtained.

*Example 4*

A charge of 60.0 g. (0.148 mole) of $\Delta^4$-pregnene-11β, 17α,21-triol-3,20-dione 21-acetate is slurried with 122 ml. of natural collidine, and then 370 ml. of dimethylformamide is added. This sequence of addition allows the steroid to dissolve momentarily and then quickly separate as fine crystals of the dimethyl formamide complex. Good stirring is essential to keep the resulting thick slurry mobile. The mixture is cooled to 10° C. and 37 ml. of methanesulfonyl chloride which contains 3.2% sulfur dioxide is slowly added during a period of about two minutes. The batch is allowed to stir at 25–35° C. for ten minutes and then excess reagent is destroyed by the gradual addition of 60 ml. of water. Even with ice-bath cooling, the temperature of the reaction mixture rises to about 59° C. The thin slurry is cooled to room temperature and added gradually to 3700 ml. of hot (80–90° C.) water with good agitation. (Precipitation of the product by hot water allows the isolation of a partially-hydrated material which is easily freed of water at moderate temperatures. Precipitation by cold water furnishes the dimethylformamide complex of the product which requires either vigorous drying conditions in order to be rid of the solvent, or a slurry treatment with hot water, in which case the hydrate is obtained.) This mixture is stirred at 85–90° C. for one hour, cooled to room temperature and filtered. The product is washed several times with water and dried in air at 60° C. There is obtained 56.0 g. (97.7%) of cream-colored powder which melts at 226–

228.5° C. and contains 0.6% water (by Karl Fischer titration). It has a specific rotation (c.=0.5) in chloroform at +131.8° C. Treatment of this product with ten parts of refluxing methanol gives a recovery of about 92% of $\Delta^{4,9(11)}$-pregnadiene-17$\alpha$,21-diol-3,20-dione 21-acetate which melts at 234–237° C.

The above procedure in the absence of sulfur dioxide gives only unchanged starting material.

*Example 5*

A solution of 16.7 g. (0.04 mole) of 16$\alpha$-methyl-$\Delta^{1,4}$-pregnadiene-11$\beta$,17$\alpha$,21-triol-3,20-dione 21-acetate, 24.5 g. (0.128 mole) of p-toluenesulfonyl chloride and 100 ml. of dimethylformamide is cooled to 10° C. and 33 ml. of collidine is added. After five minutes at room temperature, a portion of the deep-red solution is removed and quenched with water. Paper-strip analysis of this portion reveals that no dehydration has occurred.

The remaining mixture is cooled to 10° C. immediately after removal of the aliquot, and is treated with 5.0 ml. of a solution of sulfur dioxide in dimethylformamide (4.7% by weight, about 3.5 millimoles). The temperature rises sharply to a maximum of 33° C. After five minutes at 25–33° C. an ice bath is placed in position to cool the reaction flask. Then 17 ml. of water is slowly added in order to decompose the excess p-toluene-sulfonyl chloride. Sufficient water is then added to just dissolve the precipitate without causing precipitation of the product. The clear, orange to red colored solution is then added dropwise with efficient stirring to one liter of water during a period of 20 minutes. The reaction flask and funnel are rinsed successively with a small quantity of methanol and then water. The rinses are added to the slurry. The resulting slurry is then stirred for one hour at 20–25° C. The product is collected, washed with water and air-dried at 60° C. to constant weight. The yield of bright-yellow 16$\alpha$-methyl-$\Delta^{1,4,9(11)}$-pregnatriene-17$\alpha$,21-diol-3,20-dione 21-acetate is 14.9 g. (93%); M.P. 198–208° C. Paper-strip analysis showed that complete dehydration had occurred.

In the above procedure it has been found that the mixture of p-toluenesulfonyl chloride and sulfur dioxide in dimethylformamide solution may be added as one reagent, or the collidine and sulfur dioxide may be mixed and added to the solution of the remaining reactants.

*Example 6*

A mixture of 16.7 g. (0.04 mole) of 16$\alpha$-methyl-$\Delta^{1,4}$-pregnadiene-11$\beta$,17$\alpha$,21-triol-3,20-dione 21-acetate, 90 ml. of dimethylformamide and 33 ml. of collidine is cooled to 15° C. and treated with 16.4 ml. (22.6 g., 0.128 mole) of benzenesulfonyl chloride. The temperature rises sharply and the color of the mixture deepens to a red-orange. When the temperature reaches 30° C. the mixture is cooled to 10° C. by means of an ice-bath and treated with 10 ml. of a solution of sulfur dioxide in dimethyl-formamide (3.6% by weight). The temperature again rises and is maintained at 25–28° C. by external cooling. Precipitation of the quenched solution into water gives 14.5 g. (91%) of 16$\alpha$-methyl-$\Delta^{1,4,9(11)}$-pregnatriene-17$\alpha$,21-diol-3,20-dione 21-acetate, a yellow powder which melts at 184–204° C. Recrystallization from ethanol raises the melting point to 211–215° C. (62% recovery).

*Example 7*

A mixture of 16.7 g. (0.04 mole) of 16$\alpha$-methyl-$\Delta^{1,4}$-pregnadiene-11$\beta$,17$\alpha$,21-triol-3,20-dione 21-acetate, 33 ml. of collidine and 95 ml. of dimethylformamide is cooled to 10° C. and 14.8 ml. (18.0 g., 0.128 mole) of freshly-distilled benzoyl chloride is added gradually. Heat is evolved, a precipitate appears, and the color of the solution changes gradually to chocolate-brown. After five minutes at 25–30° C. an aliquot is removed and analyzed by paper-strip chromatography. No dehydration has occurred.

The remaining mixture is cooled to 10° C. immediately after the aliquot has been removed, and is treated with 5.0 ml. of 4.7% sulfur dioxide in dimethylformamide (about 3.5 millimoles). The temperature is allowed to rise to 30° C. and maintained between 25° C. and 30° C. for five minutes. The excess reagent is then destroyed by the addition of a small quantity of water. When the clear, red solution is added to water, only gum is obtained. The aqueous phase is decanted from the gum which is then washed with fresh water, dried by azeotropic distillation with benzene and finally dissolved by warming in 100 ml. of ethanol. Cooling and seeding the solution causes white crystals of 16$\alpha$-methyl-$\Delta^{1,4,9(11)}$-pregnatriene-17$\alpha$,21-diol-3,20-dione 21-acetate to separate. The product is collected, washed with cold ethanol and dried in air at 50° C. The yield of the product, which has a melting point of 210–213° C. is 4.0 g. (about 25%). Paper-strip analysis shows that this product contains about 98% of the desired triene and about 2% of unchanged starting material. The mother liquor solids consist of about 60% product and 40% starting material.

*Example 8*

A mixture of 16.7 g. (0.04 mole) of 16$\alpha$-methyl-$\Delta^{1,4}$-pregnadiene-11$\beta$,17$\alpha$,21-triol-3,20-dione 21-acetate, 33 ml. of collidine, and 90 ml. of dimethylformamide at 10° C. is treated with a solution of 23.7 g. (0.128 mole) of p-nitrobenzoyl chloride in 10 ml. of dimethylformamide which also contains about 3% sulfur dioxide by weight. Heat is evolved. After five minutes at 25–45° C. the excess reagent is destroyed by the addition of a small quantity of water. When the clear, red solution is added to water a gum separates which solidifies after standing for several days. The gum is collected, washed with water and recrystallized, still wet, from 75 ml. of ethanol (hot filtration). There is obtained 6.55 g. (41%) of 16$\alpha$-methyl-$\Delta^{1,4,9(11)}$-pregnatriene-17$\alpha$,21-diol-3,20-dione 21-acetate which melts at 212–215.5° C. Paper-strip analysis of this product and its mother liquor shows that essentially quantitative conversion has taken place.

We claim:

1. The process which comprises reacting a mixture of an 11$\beta$-hydroxy-steroid of the pregnane series and an organic base with an organic acid halide reactant selected from the group consisting of benzene sulfonyl halides, benzoyl halides, and lower alkane sulfonyl halides, in the presence of anhydrous sulfur dioxide to form the corresponding $\Delta^{9(11)}$-steroid.

2. A process according to claim 1, in which the amount of anhydrous sulfur dioxide present equals 0.01 to 0.10 part by weight of the weight of the organic acid halide used.

3. In the conversion of an 11$\beta$-hydroxy-steroid of the pregnane series into a $\Delta^{9(11)}$-anhydro-steroid by the dehydrating action of methanesulfonyl chloride in the presence of an organic base, the process improvement which comprises conducting said dehydration in the presence of anhydrous sulfur dioxide.

4. A process according to claim 3, in which the amount of anhydrous sulfur dioxide present equals 0.01 to 0.10 part by weight of the methane sulfonyl chloride.

5. The process which comprises reacting 16$\alpha$-methyl-$\Delta^{1,4}$-pregnadiene-11$\beta$,17$\alpha$,21-triol-3,20-dione 21-lower aliphatic carboxylic acid ester with methanesulfonyl chloride and anhydrous sulfur dioxide in the presence of an organic base to produce 16$\alpha$-methyl-$\Delta^{1,4,9(11)}$-pregnatriene-17$\alpha$,21-diol-3,20-dione 21-lower aliphatic carboxylic acid ester.

6. The process which comprises reacting $\Delta^{1,4}$-pregnadiene-11$\beta$,17$\alpha$,21-triol-3,20-dione 21-lower aliphatic carboxylic acid ester with methanesulfonyl chloride and anhydrous sulfur dioxide in the presence of an organic base to produce $\Delta^{1,4,9(11)}$-pregnatriene-17$\alpha$,21-diol-3,20-dione 21-lower aliphatic carboxylic acid ester.

7. The process which comprises reacting $\Delta^4$-pregnene-11β,17α,21-triol-3,20-dione 21-lower aliphatic carboxylic acid ester with methanesulfonyl chloride and anhydrous sulfur dioxide in the presence of an organic base to produce $\Delta^{4,9(11)}$-pregnadiene-17α,21-diol-3,20-dione 21-lower aliphatic carboxylic ester.

8. The process which comprises reacting 16α-methyl-$\Delta^{1,4}$-pregnadiene-11β,17α,21-triol-3,20-dione 21-acetate with a mixture of methanesulfonyl chloride and anhydrous sulfur dioxide, said mixture containing about .035 part by weight of anhydrous sulfur dioxide for each part of methanesulfonyl chloride, in the presence of collidine and dimethylformamide to produce 16α-methyl-$\Delta^{1,4,9(11)}$-pregnatriene-17α,21-diol-3,20-dione 21-acetate.

9. The process which comprises reacting $\Delta^{1,4}$-pregnadiene-11β,17α,21-triol-3,20-dione 21-acetate with a mixture of methanesulfonyl chloride and anhydrous sulfur dioxide, said mixture containing about .035 part by weight of anhydrous sulfur dioxide for each part of methanesulfonyl chloride, in the presence of collidine and dimethylformamide to produce $\Delta^{1,4,9(11)}$-pregnatriene-17α,21-diol-3,20-dione 21-acetate.

10. The process which comprises reacting $\Delta^4$-pregnene-11β,17α,21-triol-3,20-dione 21-acetate with a mixture of methanesulfonyl chloride and anhydrous sulfur dioxide, said mixture containing about .035 part by weight of anhydrous sulfur dioxide for each part of methanesulfonyl chloride, in the presence of collidine and dimethylformamide to produce $\Delta^{4,9(11)}$-pregnadiene-7α,21-diol-3,20-dione 21-acetate.

11. The process which comprises reacting a mixture of 11β-hydroxy-steroid of the pregnane series and an organic base with a benzenesulfonyl halide in the presence of anhydrous sulfur dioxide, to form the corresponding $\Delta^{9(11)}$-steroid.

12. The process which comprises reacting a mixture of 16α-methyl-$\Delta^{1,4}$-pregnadiene-11β,17α,21-triol-3,20-dione 21-acetate and an organic base with p-toluene-sulfonyl chloride in the presence of anhydrous sulfur dioxide to form the 16α-methyl-$\Delta^{1,4,9(11)}$-pregnatriene-17α,21-diol-3,20-dione 21-acetate.

13. The process which comprises reacting a mixture of a 16α-methyl-$\Delta^{1,4}$-pregnadiene-11β,17α,21-triol-3,20-dione 21-acetate and an organic base with benzene sulfonyl chloride in the presence of anhydrous sulfur dioxide to form the 16α-methyl-$\Delta^{1,4,9(11)}$-pregnatriene-17α,21-diol-3,20-dione 21-acetate.

14. The process which comprises reacting a mixture of 11β-hydroxy-steroid of the pregnane series and an organic base with a benzoyl halide in the presence of anhydrous sulfur dioxide to form the corresponding $\Delta^{9(11)}$-steroid.

15. The process which comprises reacting a mixture of 16α-methyl-$\Delta^{1,4}$-pregnadiene-11β,17α,21-triol-3,20-dione 21-acetate and an organic base with benzoyl chloride in the presence of anhydrous sulfur dioxide to form the 6α-methyl-$\Delta^{1,4,9(11)}$-pregnatriene-17α,21-diol-3,20-dione 21-acetate.

16. The process which comprises reacting a mixture of 16α-methyl-$\Delta^{1,4}$-pregnadiene-11β,17α,21-triol-3,20-dione 21-acetate and an organic base with p-nitro-benzoyl chloride in the presence of anhydrous sulfur dioxide to form the 16α-methyl-$\Delta^{1,4,9(11)}$-pregnatriene-17α,21-diol-3,20-dione 21-acetate.

17. The process which comprises reacting a mixture of an 11β-hydroxy-steroid of the pregnane series and an organic base with an organic acid halide reactant selected from the group consisting of benzene sulfonyl halides, benzoyl halides, and lower alkane sulfonyl halides, in the presence of a substantially anhydrous acid anhydride to form the corresponding $\Delta^{9(11)}$-steroid.

References Cited in the file of this patent

UNITED STATES PATENTS

| | | |
|---|---|---|
| 2,838,498 | Magerlein et al. | June 10, 1958 |
| 2,865,808 | Agnello et al. | Dec. 23, 1958 |